United States Patent
Carmody et al.

(10) Patent No.: US 8,548,459 B1
(45) Date of Patent: Oct. 1, 2013

(54) REPLACING FIELD HARDWARE INVOLVING UTILIZATION OF A SMART PHONE

(75) Inventors: John Richard Carmody, Rochestown (IE); Gerard Vincent Hallissey, Ballincollig (IE)

(73) Assignee: EMC Corporation, Hopkinton, MA (US)

( * ) Notice: Subject to any disclaimer, the term of this patent is extended or adjusted under 35 U.S.C. 154(b) by 160 days.

(21) Appl. No.: 13/246,025

(22) Filed: Sep. 27, 2011

(51) Int. Cl.
*H04W 24/00* (2009.01)
*H04B 17/00* (2006.01)

(52) U.S. Cl.
USPC .................. 455/424; 455/423; 455/67.11

(58) Field of Classification Search
USPC .............. 455/418–425, 66.1, 67.11–67.16, 455/550.1, 552.1, 553.1, 556.1, 556.2, 557, 455/566, 226.1; 715/205; 340/635; 379/1.01–35
See application file for complete search history.

(56) References Cited

U.S. PATENT DOCUMENTS

| | | | |
|---|---|---|---|
| 7,277,717 B1 | 10/2007 | Hart et al. | |
| 7,966,384 B2 | 6/2011 | Marr | |
| 8,185,142 B2 | 5/2012 | Hart et al. | |
| 8,311,765 B2 | 11/2012 | Nielsen et al. | |
| 8,417,271 B2 | 4/2013 | Hart et al. | |
| 2005/0125118 A1* | 6/2005 | Chalker et al. | 701/33 |
| 2007/0266310 A1* | 11/2007 | Sasaki et al. | 715/513 |
| 2008/0167937 A1* | 7/2008 | Coughlin et al. | 705/9 |
| 2010/0304787 A1* | 12/2010 | Lee et al. | 455/556.1 |
| 2011/0191058 A1* | 8/2011 | Nielsen et al. | 702/130 |
| 2013/0059578 A1* | 3/2013 | Finberg | 455/425 |

* cited by examiner

*Primary Examiner* — San Htun
(74) *Attorney, Agent, or Firm* — BainwoodHuang

(57) ABSTRACT

A technique enables robust and reliable replacement of field hardware. The technique involves providing a set of instructions to a user from a smart phone. The set of instructions directs the user to perform a field hardware replacement operation at a field hardware installation site. The technique further involves, in accordance with the set of instructions, collecting field hardware data from the field hardware installation site using the smart phone prior to performing the field hardware replacement operation. The technique further involves receiving additional field hardware data regarding the field hardware installation site using the smart phone after performing the field hardware replacement operation.

13 Claims, 5 Drawing Sheets

REPLACING FIELD HARDWARE INVOLVING UTILIZATION OF A SMART PHONE

BACKGROUND

When a data storage system at a customer location suffers a hardware failure, a field technician typically visits the customer location to repair or replace failed hardware. Types of data storage system hardware which may require repair or replacement include disk drives, control circuitry (e.g., storage processors, front-end director modules, back-end director modules, blades, etc.), memory boards, network adapters, and power supplies, among other things.

Prior to the customer location visit, the technician typically prints out a comprehensive repair manual (or primus document) which describes a variety of possible situations which the technician may encounter at the customer location, and procedures for handling such situations. The technician brings this repair manual to the customer location along with replacement hardware unless such hardware is already present at the customer location.

Once the technician arrives at the customer location, the technician diagnoses the situation using the repair manual as a reference, and performs a hardware replacement (or repair) operation to bring the data storage system back to proper working condition. Afterward, the technician typically fills out a debriefing report which provides details of the visit, and submits the debriefing report, perhaps along with failed hardware, back to a home office. Such a submission may be useful for a back-end root cause analysis in order to spot failure trends and identify causes, and thus improve future products, services and problem solving routines.

SUMMARY

Unfortunately, there are deficiencies to the above-described conventional approach to repairing or replacing hardware of a data storage system at a customer location. For example, the comprehensive repair manual assumes the presence of certain components, versions, model numbers, configurations, etc. However, in some situations, the data storage system at the customer location may have changed but gone unrecorded. As a result, the repair manual may not properly address the correct data storage system configuration. For instance, certain modules may be incorrectly assumed to be hot-swappable by the repair manual even though the actual hardware is not hot swappable. In such a situation, performance of a hot-swapping operation may cause the data storage system to crash or perhaps cause further damage to the hardware.

Additionally, upon completion of the replacement operation, it is burdensome for the technician to fill out a debriefing report. Along these lines, significant time and effort may be required to write a comprehensive description of the repair operation in order to accurately record all of the visit details. Moreover, such reports may be inconsistent among different technicians or due to individual factors such as differences in the level of effort or particular language provided by each technician.

Furthermore, the technician may find it difficult to coordinate proper return of the debriefing report and the failed hardware to the home office for subsequent root cause analysis. In particular, the technician may not be well skilled in return procedures or possess the discipline to meticulously save and ship back all of the failed hardware in a timely manner.

In contrast to the above-described conventional approach to replacing hardware of a data storage system at a customer location, improved techniques involve the use of an enhanced (or augmented) smart phone device to guide a user through various phases of a visit to a field hardware installation site. Such use of the smart phone device enables the user to obtain an accurate understanding of the particular hardware which is present and the associated requirements (e.g., by electronically taking an accurate inventory of the actual hardware using the smart phone device). Additionally, such use of the smart phone device enables the user to properly and safely perform a replacement (or repair) operation (e.g., based on up-to-date procedures for the actual hardware obtained by the smart phone device in real time). Furthermore, such use of the smart phone device assists the user in effectively and comprehensively creating a report following the repair/replacement operation (e.g., by saving accurate and detailed information in the smart phone device in an automated manner). Accordingly, the enhanced smart phone device is an effective aide to the user before, during and after the replacement operation.

One embodiment is directed to a method of replacing field hardware. The method includes providing a set of instructions to a user from a smart phone. The set of instructions directs the user to perform a field hardware replacement operation at a field hardware installation site. The method further includes, in accordance with the set of instructions, collecting field hardware data from the field hardware installation site using the smart phone prior to performing the field hardware replacement operation. The method further includes receiving additional field hardware data regarding the field hardware installation site using the smart phone after performing the field hardware replacement operation.

Other embodiments are directed to an electronic smart phone apparatus, computer program products, and so on. Some embodiments are directed to various processes, electronic components and circuits which are involved in replacing field hardware at a field hardware installation site.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves the use of specialized smart phone device to guide a user through particular phases of a visit to a field hardware installation site. Such use of the smart phone device enables the user to obtain an accurate understanding of the particular hardware which is present and the associated requirements (e.g., by electronically taking an accurate inventory of the actual hardware using the smart phone device). Additionally, such use of the smart phone device enables the user to properly and safely perform a replacement (or repair) operation (e.g., based on up-to-date procedures for the actual hardware obtained by the smart phone device in real time). Furthermore, such use of the smart phone device assists the user in effectively and comprehensively creating a report following the replacement operation (e.g., by saving accurate and detailed information in the smart phone device). As a result, the smart phone device is an effective aide to the user before, during and after the replacement operation.

Figure 1:
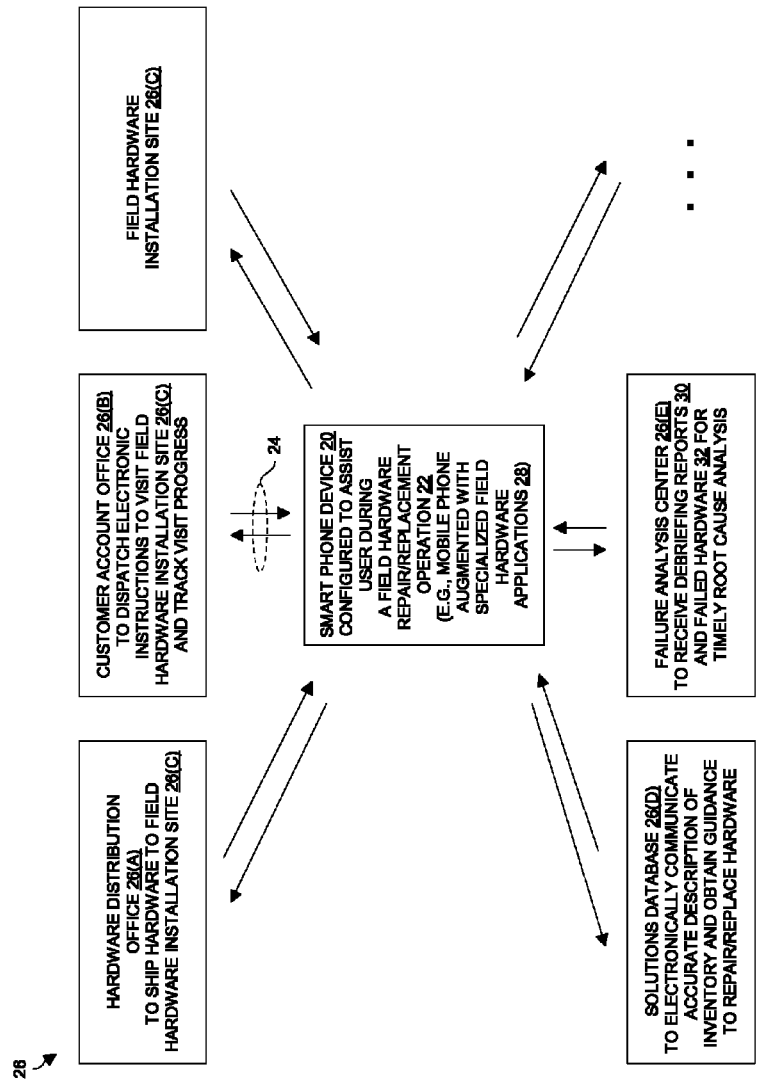
FIG. 1 is a block diagram of an enhanced smart phone device illustrating various features which are utilized by a user during when replacing field hardware.

FIG. 1 shows a specialized smart phone device 20 which is equipped to guide a user (e.g., a customer service engineer) through a field hardware replacement operation 22. To this end, the specialized smart phone device 20 is constructed and arranged to wirelessly exchange specialized data 24 with a variety of entities 26 such as a hardware distribution office 26(A), a customer account office 26(B), a field hardware installation site 26(C) (e.g., a customer), a solutions database 26(D), a failure analysis center 26(E), and so on.

In some arrangements, the smart phone device 20 includes standard mobile phone circuitry which is augmented to run a set of specialized field hardware applications 28 adapted to assist the user during the field hardware replacement operation 22. When the user executes the set of applications 28, the user is able to retrieve as well as furnish information regarding the replacement operation 22 in a wireless manner in real time (i.e., by receiving and transmitting electronic signals). In particular, certain activities can rely on the set of applications 28 to accurately record and communicate information thus alleviating this burden from the user and reducing susceptibility to user error or user inaccuracies/inconsistencies.

For example, via the smart phone device 20, the user is able to communicate with the hardware distribution office 26(A) to reliably determine whether replacement hardware is present at the field hardware installation site 26(C). In particular, the user is able to run a specialized application 28 which automatically queries a shipping database which indicates whether the replacement hardware has been delivered to, and received by, the field hardware installation site 26(C).

As another example, the smart phone device 20 is able to communicate with the customer account office 26(B) to receive dispatch instructions and report whereabouts of the user for visit tracking purposes. In particular, the smart phone device 20 runs a specialized application 28 which automatically identifies a current location of the user for automatic sensing of when the user arrives at, and departs from, the field hardware installation site 26(C).

As another example, the smart phone device 20 is able to electronically communicate directly with the field hardware installation site 26(C) remotely while in transit to the field hardware installation site 26(C). In particular, the user is able to run a specialized application 28 which remotely connects to equipment of the field hardware installation site 26(C). Accordingly, the user is able to perform certain remedial activities remotely (e.g., electronically check the operating status of the equipment, perform preliminary tests, etc.). With such remote access to the equipment, the user may be able to more accurately set expectations of the customer at the onset so that there are few if any surprises later on.

As yet another example, the smart phone device 20 is able to electronically query a solutions database 26(D) to electronically communicate an accurate inventory (or description) of the particular field hardware which is currently in place at the field hardware installation site 26(C) as well as obtain appropriate guidance for that particular field hardware. In particular, the user is able to run a specialized application 28 which electronically reads (or scans) labels of the equipment and retrieves servicing instructions which are appropriate for that equipment. Accordingly, even if earlier records indicated that the field hardware installation site 26(C) possessed a different hardware configuration or version, the user is able to take an accurate inventory on the fly and obtain guidance appropriate for the actual hardware inventory currently at the field hardware installation site 26(C).

Furthermore, as another example, the smart phone device 20 enables the user to generate a timely debriefing report 30 upon completion of the replacement operation and conveniently associate failed hardware 32 with the debriefing report 30. Along these lines, the user is able to run a specialized application 28 which enables the user to conveniently provide information describing the visit to a failure analysis center 26(E) (e.g., dictation to speech-to-text circuitry), and notify the failure analysis center 26(E) to remind the user to provide failed hardware 32 obtained from the field hardware installation site 26(C). Accordingly, the failure analysis center 26(E) is able to obtain both the debriefing report 30 and the associated failed hardware 32 shortly after the replacement operation 22 for timely root cause analysis. Further details will now be provided with reference to FIG. 2.

Figure 2:
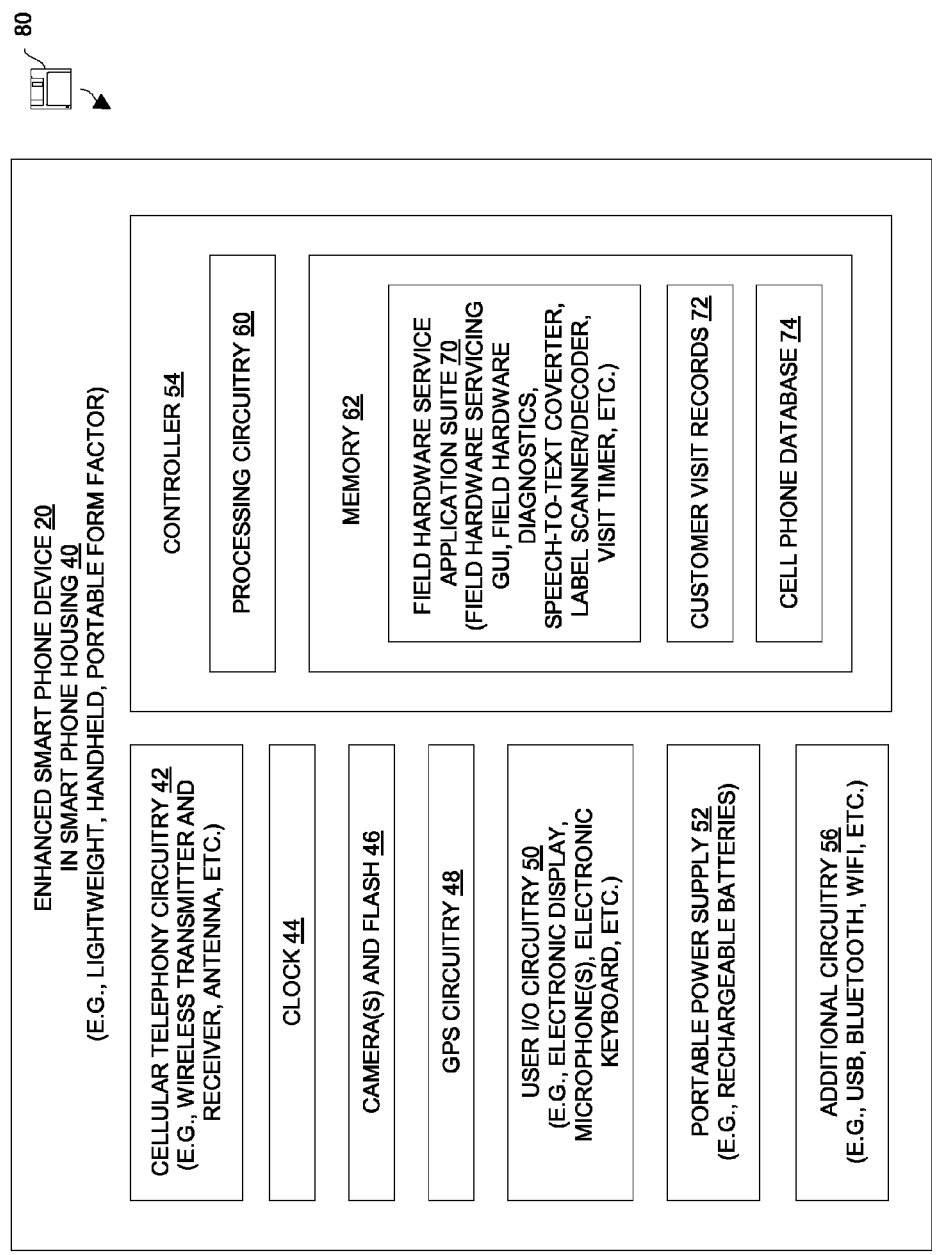
FIG. 2 is a block diagram of particular details of the enhanced smart phone device of FIG. 1.

FIG. 2 shows particular details of the enhanced smart phone device 20. The smart phone device 20 includes a smart phone housing 40, cellular telephony circuitry 42, a clock 44, camera and flash circuitry 46, global satellite positioning (GPS) circuitry 48, user I/O circuitry 50, a portable power supply 52, a controller 54, and additional circuitry 56. The controller 54 includes processing circuitry 60 and memory 62. The memory 62 stores, among other things, a field hardware service application suite 70 (e.g., a field hardware servicing graphical user interface, field hardware diagnostics, a speech-to-text converter, a label scanner/decoder, a visit timer, etc.), a database of customer records 72, and cell phone database 74.

The smart phone device housing 40 is constructed and arranged to enable the user to easily carry the device 20. In particular, the smart phone device housing 40 conceals, protects and supports the various components of the smart phone device 20 in a lightweight, portable form factor which is easy to carry and maneuver.

The cellular telephony circuitry 42 is constructed and arranged to establish and maintain wireless phone calls between the user and other parties (e.g., a central station, a customer, etc.) while the user moves between and operates at different remote user locations. Such circuitry 42 may include a wireless transmitter, a wireless receiver, an antenna, and so on. When the user makes such phone calls, the cellular telephony circuitry 42 is capable of accessing the cell phone database 74 stored within the memory 62 (e.g., for call logging, speed dialing, etc.).

The clock 44 is constructed and arranged to output timestamps which can be accessed by the controller 54 thus enabling the controller 54 to determine times when the user arrives at and departs from the field hardware installation site 26(C). Such information can be stored within the customer visit records 72.

The camera and flash circuitry 46 is constructed and arranged to capture images which can be accessed by the controller 54 thus enabling the controller 54 to electronic read hardware information (e.g., labels of hardware components) at the field hardware installation site 26(C). Again, such information can be stored within the customer visit records 72.

The GPS circuitry 48 is constructed and arranged to identify a current location of the user while the user carries the smart phone device 20 thus enabling the controller 54 to precisely identify when the user has arrived at, and departed from, the field hardware installation site 26(C). Such information can be stored within the customer visit records 72.

The user I/O circuitry 50 is constructed and arranged to provide user output to the user, and receive user input from the user. Along these lines, the smart phone I/O circuitry 50 includes an electronic display to display visual information to the user, a microphone to receiving audio information (commands, data, etc.) from the user, and an electronic keyboard to receive additional input from the user (e.g., key presses). In some arrangements, the electronic display and the electronic keyboard (e.g., physical buttons) are physical separate components. In other arrangements, the electronic display and the electronic keyboard are integrated together (e.g., the electronic display senses changes in capacitance due to the user touching portions of the electronic display with a finger).

The portable power supply 52 is constructed and arranged to supply power to the various components of the enhanced smart phone device 20 while the user carries the device 20 in a handheld manner at the field hardware installation site 26(C), and from one site location to another. In some arrangements, the portable power supply 52 includes rechargeable batteries which receive charge while connected to power sources (e.g., wall power, a computerized device through a USB cable, etc.).

The controller 54 is constructed and arranged to provide guidance to the user in order to enable the user to carry out a comprehensive and well-structured visit to the field hardware installation site 26(C). Along these lines, the processing circuitry 60 runs code from the field hardware service application suite 70 (also see the set of applications 28 in FIG. 1) to form a useful tool which aides the user before, during and after the replacement operation 22. During such operation, the controller 54 is capable of accessing the other components of the smart phone device 20 and utilizing their particular features.

The additional circuitry 56 enriches the operation of the smart phone device 20. For example, a USB port enables the smart phone device 20 to connect to a computerized device via a USB cable. As another example, Bluetooth and WiFi circuitry enable the smart phone device 20 to connect to other circuits in a wireless manner.

In some arrangements, a computer program product 80 having a non-transitory computer readable storage medium delivers the field hardware service application suite 70 to the memory 62. Suitable forms for a non-transitory computer readable storage medium which delivers executable instructions in a non-volatile manner include CD-ROM, disk memory, tape memory, flash memory, and the like. Further details will now be provided with reference to FIG. 3.

Figure 3:
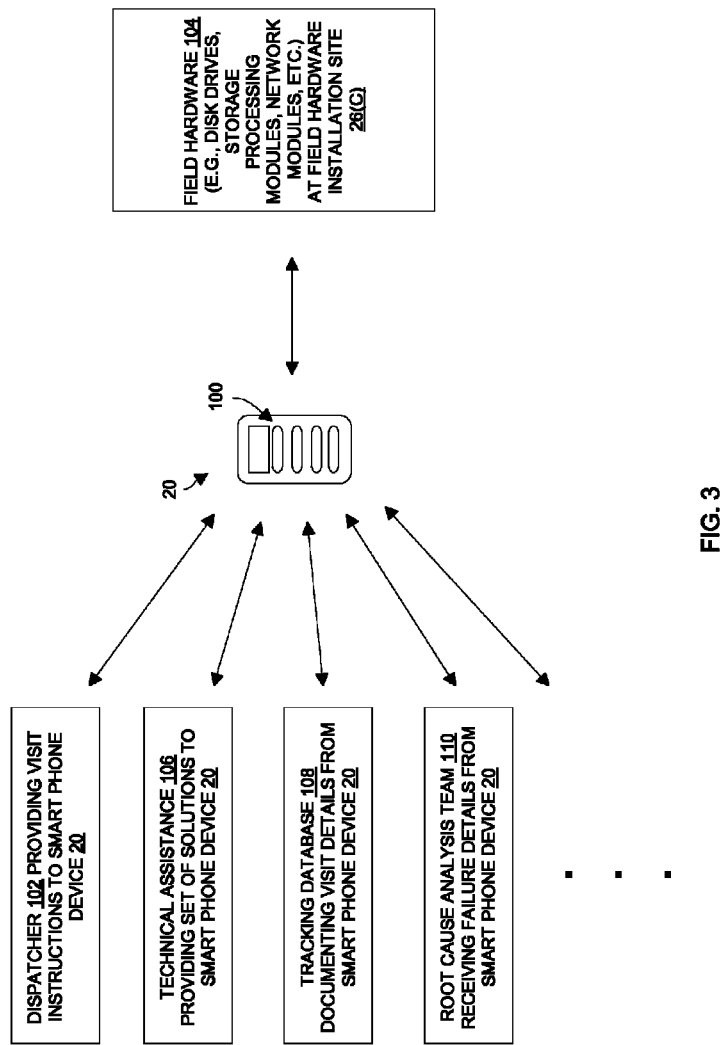
FIG. 3 is a block diagram of the enhanced smart phone device in an operating environment.

FIG. 3 shows the smart phone device 20 in operation. The smart phone device 20 provides a field visit graphical user interface (GUI) 100 on the user I/O circuitry 50 (also see FIG. 2) to assist the user in visits to field hardware installation sites 26(C). The field visit GUI 100 enables the user to access various features of the field hardware service application suite 70 (also see FIG. 2) while guiding the user through a set of field visit activities.

For example, the user is able to enter a command into the field visit GUI 100 which places the smart phone device 20 into a new visit (or scheduling) mode that informs a dispatcher 102 that the user is ready for a new assignment. In response, a dispatcher 102 issues a set of instructions to the user by transmitting field hardware data to the smart phone device 20 which is rendered on the field visit GUI 100. Information such as the type of field hardware 104 (e.g., a high-end data storage system, mid-tier data storage arrays, etc.) are displayed to the user along with the location and a scheduled arrival time. The user is able to identify whether all materials for the visit are available, e.g., via the field visit GUI 100 the user is able to inspect whether appropriate replacement hardware is available at the field hardware installation site 26(C), is on the truck, and so on. Some of the instructions may direct the user to obtain a current inventory of the field hardware 104 upon arrival particularly if a significant amount of time has passed since some of the data may be out of date.

Once the user has confirmed that proper preparation is in place for the field visit, the user enters another command into the field visit GUI 100 which places the smart phone device 20 into a transit mode that informs a dispatcher 102 that the user is in transit to the field hardware installation site 26(C). While the user travels to the field hardware installation site 26(C), the user is able to communicate with the field hardware 104 remotely to obtain status and run diagnostics. Additionally, the controller 54 automatically queries the GPS circuitry 48 periodically to determine whether the user has arrived at the field hardware installation site 26(C), e.g., by comparing the user's current location to a location of the field hardware installation site 26(C). Once the controller 54 determines that the user has arrived at the field hardware installation site 26(C), the controller 54 automatically reads the clock 44 to obtain a timestamp and makes a log entry in the customer visit records 72 (also see FIG. 2).

At this point, the user is able to enter another command into the field visit GUI 100 to place the smart phone device 20 into an inventory recordation mode. While in inventory recordation mode, the smart phone device 20 collects information about the actual field hardware 104 which is in place at the field hardware installation site 26(C). In particular, the controller 54 of the smart phone device 54 operates the camera and flash circuitry 46 to capture images of labels of the field hardware 104. In some arrangements, the controller 54 automatically converts information within the images into product identifiers using a label scanner/decoder (e.g., barcode scanning). Accordingly, if previous information regarding the field hardware 104 was inaccurate (e.g., some of the field hardware 104 may have been upgraded, changed, reconfigured, etc.), the user is able to obtain an updated and corrected view of the field hardware 104. It should be understood that the controller 54 is able to automatically attach metadata to the captured field hardware information such as timestamps and location information from the clock 44 and the GPS circuitry 48. The controller 54 saves the captured information within the customer visit records 72.

At this point, the user enters another command into the field visit GUI 100 which places the smart phone device 20 into a technical assistance mode. In response, the smart phone device 20 retrieves a set of solutions from a remote technical assistance source 106 based on the actual field hardware 104 determined during the inventory recordation mode. The set of solutions dictates particular user activities to be performed by the user as part of the replacement operation 22. In particular, the field visit GUI 100 enables the user to effectively navigate through an extensive amount of information (e.g., a step by step hardware testing and replacement procedure) which is presented graphically through the electronic display of the smart phone device 20.

It should be understood that the user may collect additional hardware information (i.e., operate in inventory recordation mode) and obtain further solution information (i.e., operate in technical assistance mode) to further diagnose and repair the field hardware 104. Such iterative operation provides the user of the smart phone device 20 with the ability to perform comprehensive testing and problem solving while accessing current and accurate technical assistance on the fly.

It should be understood that the replacement operation 22 may involve a variety of tasks. Such tasks may include performing tests, hot-swapping components, shutting down and rebooting modules, resetting controllers, recovering data, combinations thereof, and so on.

Once the user has completed the replacement operation 22, the user enters another command into the field visit GUI 100 which places the smart phone device 20 into a debriefing mode. While the smart phone device 20 is in the debriefing mode, the smart phone device 20 queries the user for particular information in order to properly fill out a debriefing report. In some arrangements, the controller 54 of the smart phone device 20 prompts the user to provide a verbal description of the visit into the microphone of the smart phone device 20, and a speech-to-text converter dynamically transcribes the user's input into text, before the controller 54 stores that text in the customer visit records 72. The controller 54 automatically attaches metadata to the debriefing report such as timestamps and location information from the clock 44 and the GPS circuitry 48. Furthermore, at the conclusion of the visit, the controller 54 is able to identify the precise length of time that the user spent at the field hardware installation site 26(C) (i.e., the difference between arrival and departure timestamps). The controller 54 then sends the debriefing report to a tracking database 108 which is accessed by the home office to properly inform the customer of the details of the visit and perhaps for invoicing purposes. Also a copy of the debriefing report may be forwarded to a root cause analysis team 110 for evaluation.

If the user removed failed hardware from the field hardware installation site 26(C), the user may enter a command which places the smart phone device 20 in a defective part return mode. Here, the controller 54 automatically notifies the root cause analysis team 110 that the user removed failed hardware from the field hardware installation site 26(C). For example, the controller 54 captures an electronic image of a label of a defective part of the field hardware using the camera and flash circuitry 46, and electronically converting data within the electronic image into a digital value representing a product identifier the defective part as part of a defective part return process. The controller 54 then sends this information to the root cause analysis team 110 which can now assist in tracking down the failed hardware since the user may be focused on other things such scheduling a new visit. As a result, the failed hardware is able to reach the root cause analysis team 110 reliably and in a timely manner.

At this point, the user of the smart phone device 20 is able to enter the command into the field visit GUI 100 which places the smart phone device back in the new visit mode. As a result, the dispatcher 102 now knows that the user is ready for a new assignment and issues a new set of instructions to the user.

Figure 4:
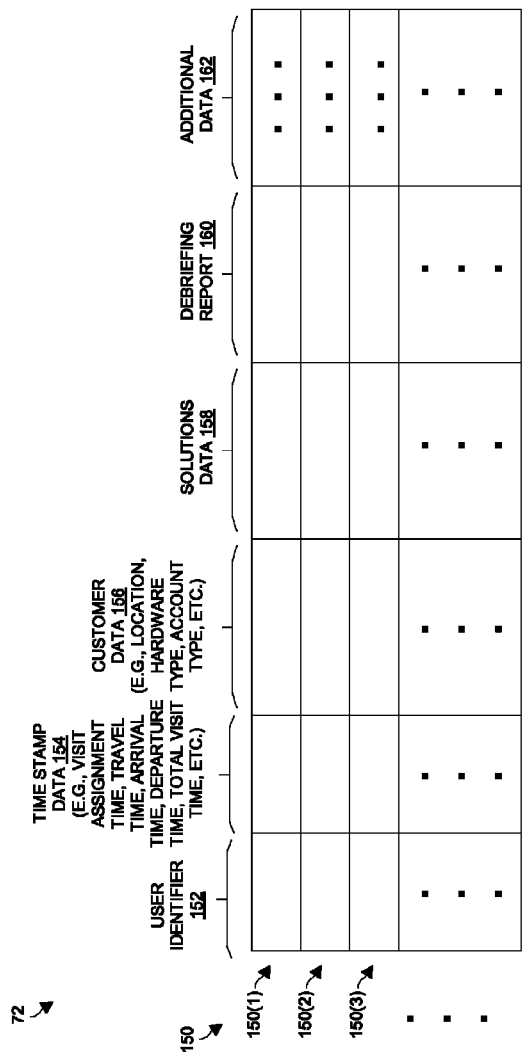
FIG. 4 is a block diagram of a particular data structure utilized by the enhanced smart phone device of FIG. 2.

FIG. 4 provides a view of the customer visit records 72 which are maintained by the smart phone device 20 (also see FIG. 2). The customer visit records 72 include records (or entries) 150(1), 150(2), 150(3), . . . (collectively, records 150) for each customer visit by the user.

Each record 150 includes a user identifier field 152, a time stamp section 154, a customer data section 156, solutions data section 158, a debriefing report section 160, and additional fields 162. The controller 54 saves and updates these records 150 until the records 150 are transferred to a central database for permanent storage (e.g., see the customer account office 26(B) in FIG. 1).

The user identifier field 152 stores the user identifier of the particular user in possession of the smart phone device 20. Accordingly, the smart phone device 20 may be shared by multiple users (e.g., multiple customer service engineers) during operation.

The time stamp section 154 stores timestamp data such as when the customer visit was assigned to the user, the amount of travel time the user required before reaching the particular field hardware installation site 26(C), the arrival time, the departure time, the total visit time, and so on. In some arrangements, the current location as identified by the GPS circuitry 48 (FIG. 2) is logged with the various timestamp data.

The customer data section 156 stores information about the customer such as the customer location, the type of hardware at the field hardware installation site 26(C), and the type of account that the customer holds. Such information can be updated at any time. For example, the user is able to direct the controller 54 to electronically take an accurate inventory of the field hardware 104 at the field hardware installation site 26(C) and store the inventory in the customer data section 156.

The solutions data section 158 stores solutions data for use by the user. Such solutions can be downloaded to the smart phone device 20 in real time once the user has obtained an accurate inventory of the field hardware 104 at the field hardware installation site 26(C).

The debriefing report section 160 stores the debriefing report which is completed by the user upon completion of the replacement operation 22. In particular, the controller 54, when in debriefing mode, prompts the user for details of the replacement operation 22 and automatically populates particular fields within the debriefing report section 160. In some arrangements, the data results from speech-to-text conversion of audio input from the user.

The records 150 are capable of storing additional information in fields 162 as well. For example, the records 150 may include a log of special requests made by the customer which fall outside the scope of the replacement operation 22. Such requests may include a message to the sales team, an instruction to upgrade a portion of the field hardware 104, and so on. Further details will now be provided with reference to FIG. 5.

Figure 5:
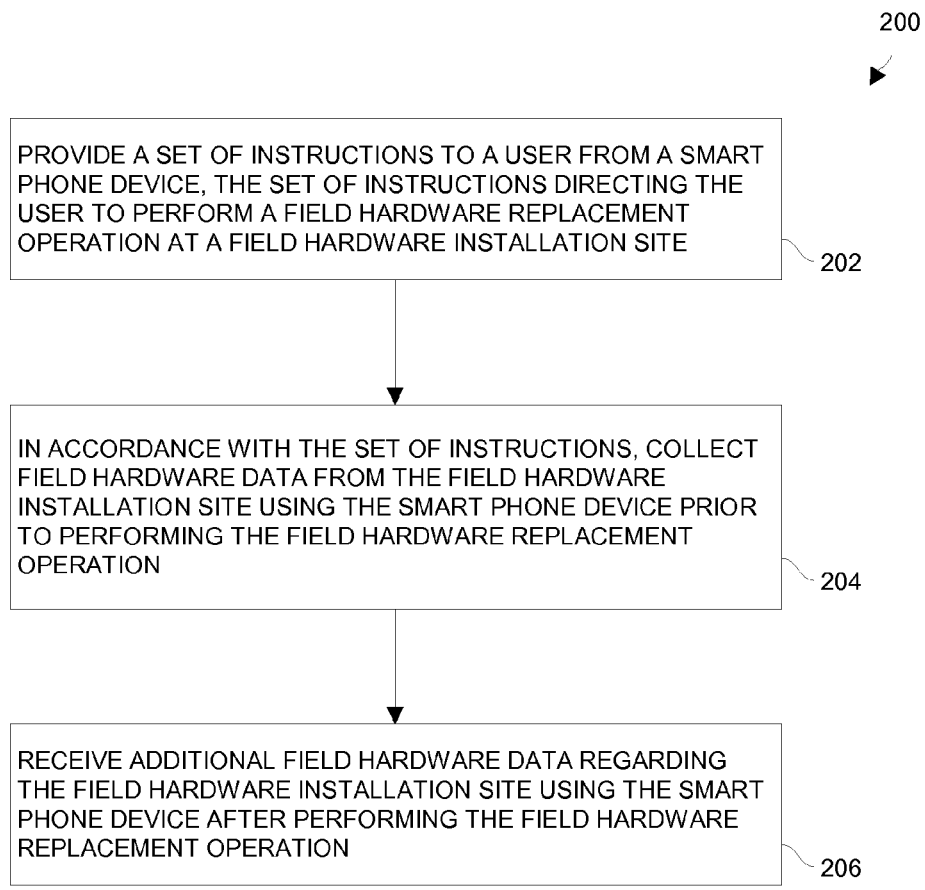
FIG. 5 is a flowchart of a procedure which is performed using the enhanced smart phone device of FIG. 2.

FIG. 5 shows, in flowchart form, a procedure 200 which is performed by the smart phone device 20 when guiding a user during replacement of field hardware 104. In step 202, the smart phone device 20 providing a set of instructions to a user. The set of instructions directs the user to perform a field hardware replacement operation 22 at a field hardware installation site 26(C) (also see the customer account office 26(B) in FIG. 1 and the dispatcher 102 in FIG. 3). Some of the instructions direct the user to obtain an accurate inventory of the field hardware 104.

In step 204, prior to performing field hardware replacement, the smart phone device 20 collects field hardware data from field hardware installation site 26(C). Along these lines, the user may scan labels of the field hardware 104 to accurately capture a current inventory of the field hardware 104. At this point, the user is able to retrieve extensive technical information about the particular field hardware 104 in order to effectively and safely carry out the field hardware replacement operation 22.

In step 206, the smart phone device 20 receives additional field hardware data regarding the field hardware installation site 26(C) using the smart phone device 20 after performing the field hardware replacement operation 22. In particular, the user creates a debriefing report and provides that debriefing report to one or more remote locations using the smart phone device 20. As a result, the smart phone device 20 provides a useful tool to the user during the field hardware replacement process.

As described above, improved techniques involve the use of a specialized smart phone device 20 to guide a user through various phases of a visit to a field hardware installation site 26(C). Such use of the smart phone device 20 enables the user to obtain an accurate understanding of the particular hardware 104 which is present and the associated requirements. Additionally, such use of the smart phone device 20 enables the user to properly and safely perform a replacement (or repair) operation. Furthermore, such use of the smart phone device 20 assists the user in effectively and comprehensively creating a debriefing report following the replacement operation 22. Accordingly, the enhanced smart phone device 20 is an effective aide to the user before, during and after the replacement operation 22.

While various embodiments of the invention have been particularly shown and described, it will be understood by those skilled in the art that various changes in form and details may be made therein without departing from the spirit and scope of the invention as defined by the appended claims.

What is claimed is:

1. A method of replacing field hardware, the method comprising:
   providing a set of instructions to a user from a smart phone, the set of instructions directing the user to perform a field hardware replacement operation at a field hardware installation site;
   in accordance with the set of instructions, collecting field hardware data from the field hardware installation site using the smart phone prior to performing the field hardware replacement operation; and
   receiving additional field hardware data regarding the field hardware installation site using the smart phone after performing the field hardware replacement operation;
   periodically carrying out wireless phone calls between the user and a central station from a variety of remote user locations using cellular telephony circuitry of the smart phone; and
   providing a field visit interface to the user from, at least in part, an electronic display of the smart phone, the field visit interface being configured to guide the user through a set of field visit activities at a field hardware installation site;
   receiving a command which directs the smart phone to enter a technical assistance mode, and
   while the smart phone operates within the technical assistance mode, electronically displaying a set of solutions to the user through an electronic display of the smart phone, the set of solutions being constructed and arranged to solve a field hardware problem at the field hardware installation site;
   wherein collecting the field hardware data from the field hardware installation site using the smart phone includes:
   receiving a command which directs the smart phone to enter an inventory recordation mode, and
   while the smart phone operates within the inventory recordation mode, obtaining an inventory of the field hardware using a camera of the smart phone at the field hardware installation site;
   wherein receiving the additional field hardware data regarding the field hardware installation site using the smart phone after performing the field hardware replacement operation includes:
   receiving a command which directs the smart phone to enter a debriefing mode, and
   while the smart phone operates within the debriefing mode, obtaining a description of field hardware replacement activity which occurred at the field hardware installation site using a microphone of the smart phone;
   wherein receiving the additional field hardware data regarding the field hardware installation site using the smart phone after performing the field hardware replacement operation includes:
   receiving a command which directs the smart phone to enter a defective part return mode, and
   while the smart phone operates within the defective part return mode, capturing an electronic image of a label of a defective part of the field hardware using the camera of the smart phone, and electronically converting data within the electronic image into a digital value representing a product identifier the defective part as part of a defective part return process;
   wherein a memory of the smart phone stores a field visit record; and
   wherein the method further comprises:
      periodically outputting a location signal of the user using global satellite positioning circuit of the smart phone, and
      saving, as part of the field visit record stored in the memory of the smart phone, a visit duration value based on the location signal and a clock circuit of the smart phone, the visit duration value representing an amount of time that the user resided at the field hardware installation site; and
   wherein the method further comprises:
      receiving a command which directs the smart phone to enter a new field visit mode, and
      while the smart phone operates within the new field visit mode, providing user output from user output components of the smart phone, the user output including user directions to a new field hardware installation site.

2. A method as in claim 1 wherein electronically displaying the set of solutions to the user through the electronic display of the smart phone includes:
   while the user is physically located at the field hardware installation site, receiving a wireless signal through a wireless receiver of the smart phone and, based on the wireless signal, graphically rendering the set of solutions to the user on the electronic display of the smart phone.

3. A method as in claim 1 wherein obtaining the inventory of the field hardware includes:
   capturing an electronic image of a label of the field hardware using the camera of the smart phone at the field hardware installation site, and electronically converting data within the electronic image into a digital value representing a product identifier of at least a portion of the field hardware.

4. A method as in claim 1 wherein obtaining the description of the field hardware replacement activity includes:
   receiving an audio signal from the user through the microphone of the smart phone, electronically converting speech data from the audio signal to text data, and saving the text data as a portion of a debriefing record which describes the field hardware replacement activity.

5. A method as in claim 1 further comprising:
wirelessly transmitting the product identifier to a central database containing defective part data for centralized root cause analysis.

6. A method as in claim 1 wherein saving the visit duration value includes:
automatically logging, in the field visit record stored in the memory, as an arrival time, a first clock output of the clock circuit in response to the location signal indicating that the user has arrived at the field hardware installation site,
automatically logging, in the field visit record stored in the memory, as a departure time, a second clock output of the clock circuit in response to the location signal indicating that the user has departed from the field hardware installation site, and
generating the visit duration value based on the arrival time logged in the field visit record and the departure time logged in the field visit record, the visit duration value substantially equaling the time difference between the logged arrival time and the logged departure time.

7. A method as in claim 1 further comprising:
while the smart phone operates within the new field visit mode, providing additional user output from user output components of the smart phone, the additional user output including a checklist of requirements for a visit to the new field hardware installation site.

8. A method as in claim 1, further comprising:
providing a field visit graphical user interface (GUI) to the user from, at least in part, an electronic display of the smart phone, the field visit GUI being configured to guide the user through a set of field visit activities at a field hardware installation site.

9. A method as in claim 1 wherein providing the set of instructions to the user from the smart phone includes:
receiving information on compatibility of the field hardware for hot-swapping modules prior to performing the field hardware replacement; and
saving field hardware replacement information in the smart phone during the field hardware replacement in an automated manner.

10. An electronic smart phone apparatus, comprising:
a smart phone chassis;
cellular telephony circuitry disposed within the smart phone chassis; and
a controller disposed within the smart phone chassis and coupled to the cellular telephony circuitry, the controller being constructed and arranged to:
provide a set of instructions to a user, the set of instructions directing the user to perform a field hardware replacement operation at a field hardware installation site,
in accordance with the set of instructions, collect field hardware data from the field hardware installation site prior to performing the field hardware replacement operation,
receive additional field hardware data regarding the field hardware installation site after performing the field hardware replacement operation;
provide periodical wireless phone calls between the user and a central station from a variety of remote user locations using cellular telephony circuitry of the smart phone;
provide a field visit interface to the user from, at least in part, an electronic display of the smart phone, the field visit interface being configured to guide the user through a set of field visit activities at a field hardware installation site;
receive a command which directs the smart phone to enter a technical assistance mode, and display electronically a set of solutions to the user through an electronic display of the smart phone, the set of solutions being constructed and arranged to solve a field hardware problem at the field hardware installation site;
wherein the field hardware data from the field hardware installation site using the smart phone includes:
a command which directs the smart phone to enter an inventory recordation mode, and obtain an inventory of the field hardware using a camera of the smart phone at the field hardware installation site;
wherein the additional field hardware data regarding the field hardware installation site using the smart phone includes:
a command which directs the smart phone to enter a debriefing mode, and a description of field hardware replacement activity which occurred at the field hardware installation site using a microphone of the smart phone;
wherein the additional field hardware data regarding the field hardware installation site using the smart phone after performing the field hardware replacement operation includes:
a command which directs the smart phone to enter a defective part return mode, and capturing an electronic image of a label of a defective part of the field hardware using the camera of the smart phone, and electronically converting data within the electronic image into a digital value representing a product identifier the defective part as part of a defective part return process;
wherein a memory of the smart phone stores a field visit record;
periodically outputs a location signal of the user using global satellite positioning circuit of the smart phone, and saving as part of the field visit record stored in the memory of the smart phone, a visit duration value based on the location signal and a clock circuit of the smart phone, the visit duration value representing an amount of time that the user resided at the field hardware installation site;
a command directing the smart phone to enter a new field visit mode, and
provide a user output from user output components of the smart phone, the user output including user directions to a new field hardware installation site.

11. An electronic smart phone apparatus as in claim 10 wherein the controller, when providing the set of instructions to the user from the smart phone, is constructed and arranged to:
receive information on compatibility of the field hardware for hot-swapping modules prior to performing the field hardware replacement; and
save field hardware replacement information in the smart phone during the field hardware replacement in an automated manner.

12. A computerized program product having a non-transitory computer readable medium storing code which, when executed by an electronic smart phone apparatus, cause the electronic smart phone apparatus to:

provide a set of instructions to a user, the set of instructions directing the user to perform a field hardware replacement operation at a field hardware installation site, in accordance with the set of instructions, collect field hardware data from the field hardware installation site prior to performing the field hardware replacement operation, and receive additional field hardware data regarding the field hardware installation site after performing the field hardware replacement operation;

provide periodical wireless phone calls between the user and a central station from a variety of remote user locations using cellular telephony circuitry of the smart phone;

provide a field visit interface to the user from, at least in part, an electronic display of the smart phone, the field visit interface being configured to guide the user through a set of field visit activities at a field hardware installation site;

receive a command which directs the smart phone to enter a technical assistance mode, and while the smart phone operates within the technical assistance mode, electronically displaying a set of solutions to the user through an electronic display of the smart phone, the set of solutions being constructed and arranged to solve a field hardware problem at the field hardware installation site;

wherein collecting the field hardware data from the field hardware installation site using the smart phone includes:

receiving a command which directs the smart phone to enter an inventory recordation mode, and while the smart phone operates within the inventory recordation mode, obtaining an inventory of the field hardware using a camera of the smart phone at the field hardware installation site;

wherein receiving the additional field hardware data regarding the field hardware installation site using the smart phone after performing the field hardware replacement operation includes:

receiving a command which directs the smart phone to enter a debriefing mode, and while the smart phone operates within the debriefing mode, obtaining a description of field hardware replacement activity which occurred at the field hardware installation site using a microphone of the smart phone;

wherein receiving the additional field hardware data regarding the field hardware installation site using the smart phone after performing the field hardware replacement operation includes:

receiving a command which directs the smart phone to enter a defective part return mode, and while the smart phone operates within the defective part return mode, capturing an electronic image of a label of a defective part of the field hardware using the camera of the smart phone, and electronically converting data within the electronic image into a digital value representing a product identifier the defective part as part of a defective part return process;

wherein a memory of the smart phone stores a field visit record; and wherein the method further comprises:

periodically outputting a location signal of the user using global satellite positioning circuit of the smart phone, and saving, as part of the field visit record stored in the memory of the smart phone, a visit duration value based on the location signal and a clock circuit of the smart phone, the visit duration value representing an amount of time that the user resided at the field hardware installation site; and wherein the method further comprises:

receiving a command which directs the smart phone to enter a new field visit mode, and while the smart phone operates within the new field visit mode, providing user output from user output components of the smart phone, the user output including user directions to a new field hardware installation site.

13. A computerized program product as in claim 12 wherein providing the set of instructions to the user from the smart phone includes:

receiving information on compatibility of the field hardware for hot-swapping modules prior to performing the field hardware replacement; and saving field hardware replacement information in the smart phone during the field hardware replacement in an automated manner.

* * * * *